US012314407B2

(12) United States Patent
Ufkes et al.

(10) Patent No.: US 12,314,407 B2
(45) Date of Patent: May 27, 2025

(54) SYSTEM AND METHOD FOR FACILITIES ACCESS BREACH DETECTION AND INFORMATION PROTECTION

(71) Applicant: Security Enhancement Systems, LLC, Northbrook, IL (US)

(72) Inventors: Philip J. Ufkes, Sullivan's Island, SC (US); Matthew Frank Trapani, Deerfield, IL (US)

(73) Assignee: Security Enhancement Systems, LLC, Northbrook, IL (US)

( * ) Notice: Subject to any disclaimer, the term of this patent is extended or adjusted under 35 U.S.C. 154(b) by 344 days.

(21) Appl. No.: 17/681,579

(22) Filed: Feb. 25, 2022

(65) Prior Publication Data

US 2022/0277087 A1 Sep. 1, 2022

Related U.S. Application Data

(60) Provisional application No. 63/205,652, filed on Feb. 28, 2021.

(51) Int. Cl.
*G06F 21/60* (2013.01)
*G07C 9/00* (2020.01)
*G08B 13/02* (2006.01)

(52) U.S. Cl.
CPC .......... *G06F 21/60* (2013.01); *G07C 9/00571* (2013.01); *G07C 9/00896* (2013.01); *G08B 13/02* (2013.01); *G06F 2221/2107* (2013.01); *G06F 2221/2143* (2013.01)

(58) Field of Classification Search
CPC ............. G06F 21/60; G06F 2221/2107; G06F 2221/2143; G07C 9/00–00571
See application file for complete search history.

(56) References Cited

U.S. PATENT DOCUMENTS

| | | | | |
|---|---|---|---|---|
| 11,496,519 | B1 * | 11/2022 | Gupta | H04L 9/0891 |
| 2007/0046424 | A1 * | 3/2007 | Davis | H04L 63/1466 |
| | | | | 340/572.1 |
| 2009/0051528 | A1 * | 2/2009 | Graichen | G07C 9/38 |
| | | | | 340/545.2 |
| 2018/0114389 | A1 * | 4/2018 | Geiszler | G07C 9/00309 |
| 2019/0371139 | A1 * | 12/2019 | Engler | G06F 21/554 |
| 2020/0314125 | A1 * | 10/2020 | Hall | H04L 63/1425 |

* cited by examiner

*Primary Examiner* — Matthew T Henning
(74) *Attorney, Agent, or Firm* — Gregory Finch; Finch Paolino, LLC

(57) ABSTRACT

A facilities access breach detection and data protection system and method. A facilities access breach detection and data protection system and method may be configured to monitor an unauthorized access event at a secured data center facility via one or more breach detection sensors. A sensor input indicating a breach event may be communicated to an electronic access controller configured to process the sensor input. If the controller determines the sensor input indicates a breach event, the controller may be configured to communicate a command to a security server comprising erasure software stored thereon. The security server may be communicably engaged with a plurality of data servers housed at the data center facility. The security server may launch an instance of the erasure software to permanently erase all or part of the data residing on the plurality of data servers being housed at the data center facility.

20 Claims, 9 Drawing Sheets

SYSTEM AND METHOD FOR FACILITIES ACCESS BREACH DETECTION AND INFORMATION PROTECTION

CROSS-REFERENCE TO RELATED APPLICATIONS

This application claims the benefit of U.S. Provisional Application Ser. No. 63/205,652, filed on Feb. 28, 2021, entitled "FACILITIES ACCESS BREACH DETECTION AND INFORMATION PROTECTION SYSTEM," the disclosure of which is hereby incorporated in its entirety at least by reference.

FIELD

The present disclosure relates to the field of electronic security systems; in particular, a system and method for detection of unauthorized access to a data center facility and automated protocols for protection of data assets stored therein.

BACKGROUND

Data centers are highly secured locations that house servers and other computing equipment to enable communications and computing networks as well as serve as storehouses of large volumes of data. Data centers are generally equipped with electronic access controls and security/alarm systems to ensure that hardware, software and data housed therein are secure and protected. Sensitive data, such as Protected Health Information (PHI), Personally Identifiable Information (PII) and other confidential information, often requires specialized levels of data protection in accordance with industry standards and government regulations. A myriad of cyber security solutions exists to protect unauthorized access to servers, applications and databases, such as intrusion detection and protection systems, firewalls, vulnerability technologies and the like. In addition, a myriad of electronic access control and/or security solutions are commonly employed at data centers to prevent unauthorized physical access to server rooms and other sensitive areas, such as door access control systems, motion/sound sensors, video monitoring and other security systems.

In recent years, the need for centralized and edge data centers has proliferated so that low latency applications can be better served with faster data access speeds. In the case with edge data centers, there are many remotely located facilities scattered throughout a region. These edge data centers are smaller in size compared to centralized data centers and can be networked in high availability configurations to ensure reliability in case of failures.

A problem facing the networked computing and communications industry is that centralized data centers and edge data centers may be targets for physical breach leading to data breach. Remotely located edge data centers are at the highest level of risk since these facilities are often unmanned for all or at least part of the day, unlike centralized data centers which often have security personnel present on-site. While edge data centers typically employ remote security monitoring, such monitoring does not fully mitigate security risk due to the fact that if the facility is physically breached by a person, security personnel response time is often too slow to effectively prevent and/or disengage the breach. There is a need, therefore, for the ability of operators of edge data centers to be able to remotely detect a physical breach and immediately take appropriate action to prevent a data breach without the need for human intervention on-site.

Through applied effort, ingenuity, and innovation, Applicant has identified a number of deficiencies and problems with security systems for data centers. Applicant has developed a solution that is embodied by the present invention, which is described in detail below.

SUMMARY

The following presents a simplified summary of some embodiments of the invention in order to provide a basic understanding of the invention. This summary is not an extensive overview of the invention. It is not intended to identify key/critical elements of the invention or to delineate the scope of the invention. Its sole purpose is to present some embodiments of the invention in a simplified form as a prelude to the more detailed description that is presented later.

Certain aspects of the present disclosure provide for a data protection system comprising at least one breach detection sensor configured to detect a physical access attempt at an access point of a data center facility; a controller communicably engaged with the at least one breach detection sensor to receive at least one sensor input from the at least one breach detection sensor in response to the physical access attempt at the access point of the data center facility; an alarm system communicably engaged with the controller, wherein the alarm system is configured to determine whether a breach event has occurred in response to the at least one sensor input from the at least one breach detection sensor; one or more local server communicably engaged with the controller or the alarm system, wherein the one or more local server comprises an erasure software stored thereon that, when executed, is configured to permanently erase all or a portion of data residing on one or more hard drives or memory devices communicably engaged with the one or more local server, wherein one or more operations of the erasure software are executed in response to determining that the breach event has occurred.

In accordance with certain embodiments of the data protection system, the one or more hard drives or memory devices may be physically present at the data center facility. In accordance with certain aspects of the present disclosure, the data protection system may further comprise one or more electronic access control device operably engaged with the controller to selectively grant and restrict access to the access point of the data center facility. In accordance with certain embodiments, the controller may be configured to receive and process one or more access credentials from one or more users to grant or deny an access request to the access point of the data center facility. In accordance with certain embodiments, the alarm system may be communicably engaged with the controller to suppress an alarm in response to a valid access request and activate an alarm in response to an invalid access request. In accordance with certain aspects of the present disclosure, the data protection system may further comprise at least one remote server communicably engaged with the one or more local servers to receive an operation status of the erasure software in real-time. In accordance with certain embodiments, the at least one remote server is configured to communicate the operation status of the erasure software to one or more client devices in real-time. In accordance with certain embodiments, the at least one remote server is configured to communicate a breach event status to one or more client devices in real-time. In accordance with certain embodiments, the one or more operations of the erasure software comprise one or more cryptographic erasure operations.

Further aspects of the present disclosure include a data protection method comprising detecting, with at least one breach detection sensor, a physical access attempt at an access point of a data center facility; receiving, with a controller communicably engaged with the at least one breach detection sensor, at least one sensor input from the at least one breach detection sensor in response to the physical access attempt at the access point of the data center facility; determining, with the controller, whether a breach event has occurred in response to the at least one sensor input from the at least one breach detection sensor; in response to determining the breach event has occurred, communicating, with the controller, a command signal to one or more local server, wherein the one or more local server comprises an erasure software stored thereon that, when executed, is configured to permanently erase all or a portion of data residing on one or more hard drives or memory devices communicably engaged with the one or more local server; and executing the one or more operations of the erasure software in response to communicating the command signal to the one or more local server.

In accordance with certain aspects of the present disclosure, the data protection method may further comprise communicating, with the one or more local server, an operation status of the erasure software in real-time to at least one remote server. The data protection method may further comprise communicating, with the at least one remote server, an operation status of the erasure software in real-time to one or more client devices. The data protection method may further comprise communicating, with the one or more local server, a status of the breach event to one or more client devices. The data protection method may further comprise receiving, with an electronic access control device communicably engaged with the controller, an access request for the access point of the data center facility. The data protection method may further comprise processing, with the controller, the access request to grant or deny access to the access point of the data center facility, wherein the access request comprises one or more authorized user credentials. The data protection method may further comprise determining, with the controller, whether the breach event has occurred in response to processing the access request. The data protection method may further comprise communicating, with the controller, the at least one sensor input from the at least one breach detection sensor to an alarm system of the data center facility. The data protection method may further comprise determining, with the alarm system, whether the breach event has occurred in response to the at least one sensor input from the at least one breach detection sensor.

Still further aspects of the present disclosure include non-transitory computer-readable medium encoded with instructions for commanding one or more processors to execute operations of a data protection method, the operations comprising receiving at least one sensor input from at least one breach detection sensor in response to a physical access attempt at an access point of a data center facility; determining whether a breach event has occurred in response to the at least one sensor input from the at least one breach detection sensor; and in response to determining the breach event has occurred, communicating a command signal to one or more local server, wherein the one or more local server comprises an erasure software stored thereon that, when executed, is configured to permanently erase all or a portion of data residing on one or more hard drives or memory devices communicably engaged with the one or more local server.

The foregoing has outlined rather broadly the more pertinent and important features of the present invention so that the detailed description of the invention that follows may be better understood and so that the present contribution to the art can be more fully appreciated. Additional features of the invention will be described hereinafter which form the subject of the claims of the invention. It should be appreciated by those skilled in the art that the conception and the disclosed specific methods and structures may be readily utilized as a basis for modifying or designing other structures for carrying out the same purposes of the present invention. It should be realized by those skilled in the art that such equivalent structures do not depart from the spirit and scope of the invention as set forth in the appended claims.

BRIEF DESCRIPTION OF DRAWINGS

The skilled artisan will understand that the figures, described herein, are for illustration purposes only. It is to be understood that in some instances various aspects of the described implementations may be shown exaggerated or enlarged to facilitate an understanding of the described implementations. In the drawings, like reference characters generally refer to like features, functionally similar and/or structurally similar elements throughout the various drawings. The drawings are not necessarily to scale, emphasis instead being placed upon illustrating the principles of the teachings. The drawings are not intended to limit the scope of the present teachings in any way. The system and method may be better understood from the following illustrative description with reference to the following drawings in which.

DETAILED DESCRIPTION

Figure 1:
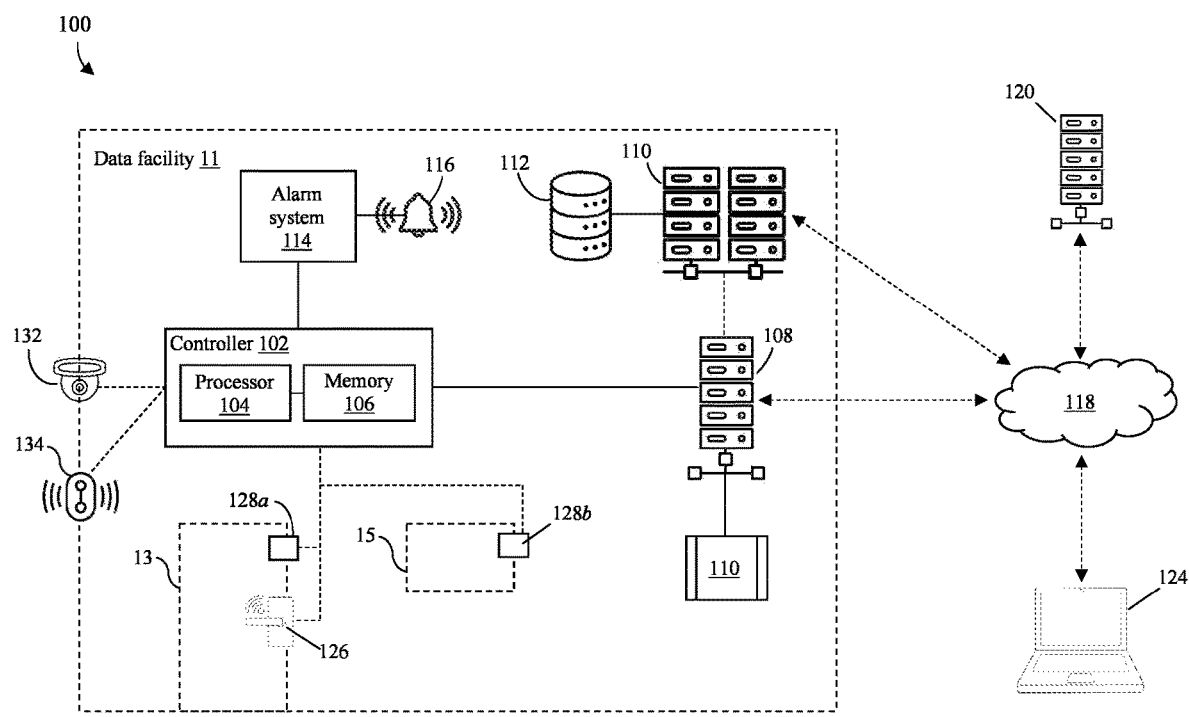
FIG. 1 is an architecture diagram of a data protection system, in accordance with certain aspects of the present disclosure.

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout. All definitions, as defined and used herein, should be understood to control over dictionary definitions, definitions in documents incorporated by reference, and/or ordinary meanings of the defined terms.

Following below are more detailed descriptions of various concepts related to, and embodiments of, inventive methods, devices and systems configured to provide for a facilities access breach detection and data protection system and method. In accordance with certain aspects of the present disclosure, the facilities access breach detection and data protection system and method is configured to monitor an unauthorized access event at a secured data center facility via one or more breach detection sensors. A sensor input indicating a breach event is communicated to an electronic access controller configured to process the sensor input to determine a breach event or an authorized access event. If the controller determines the sensor input indicates a breach event, the controller is configured to communicate a command to a security server comprising erasure software stored thereon. The security server may be communicably engaged with a plurality of data servers being housed at the data center facility. Upon receiving a confirmation of the breach event from the controller, the security server may launch an instance of the erasure software to permanently erase (and/or encrypt) all or part of the data residing on the plurality of data servers being housed at the data center facility. The security server may be communicably engaged with one or more remote management servers to communicate a status of the breach event and data erasure and/or command one or more operations of the erasure software.

It should be appreciated that various concepts introduced above and discussed in greater detail below may be implemented in any of numerous ways, as the disclosed concepts are not limited to any particular manner of implementation. Examples of specific implementations and applications are provided primarily for illustrative purposes. The present disclosure should in no way be limited to the exemplary implementation and techniques illustrated in the drawings and described below.

Where a range of values is provided, it is understood that each intervening value, to the tenth of the unit of the lower limit unless the context clearly dictates otherwise, between the upper and lower limit of that range and any other stated or intervening value in that stated range is encompassed by the invention. The upper and lower limits of these smaller ranges may independently be included in the smaller ranges, and are also encompassed by the invention, subject to any specifically excluded limit in a stated range. Where a stated range includes one or both of the endpoint limits, ranges excluding either or both of those included endpoints are also included in the scope of the invention.

As used herein, "exemplary" means serving as an example or illustration and does not necessarily denote ideal or best.

As used herein, the term "includes" means includes but is not limited to, the term "including" means including but not limited to. The term "based on" means based at least in part on.

As used herein, the term "interface" refers to any shared boundary across which two or more separate components of a computer system may exchange information. The exchange can be between software, computer hardware, peripheral devices, humans, and combinations thereof. The term "interface" may be further defined as any shared boundary or connection between two dissimilar objects, devices or systems through which information or power is passed and/or a mechanical, functional and/or operational relationship is established and/or accomplished. Such shared boundary or connection may be physical, electrical, logical and/or combinations thereof.

As used herein, the term "packet" refers to any formatted unit of data that may be sent and/or received by an electronic device.

As used herein, the term "payload" refers to any part of transmitted data that constitutes an intended message and/or identifying information.

As used herein, the term "access control system" or "electronic access control system" refers to any system for restricting entrance to a property, a building, an area, a container, and/or a room to authorized persons through the use of at least one electronic access control device.

As used herein, the term "electronic access control device" or "access control device" refers to any electronic device that may be a component of an access control system, including: an access control panel (also known as a controller); an access-controlled entry, such as a door, turnstile, parking gate, elevator, or other physical barrier; a reader installed near the entry/exit of an access-controlled area; locking hardware, such as electric door strikes, electromagnetic locks, and electronically-actuated mechanical locks; a magnetic door switch for monitoring door position; and request-to-exit (REX) devices for allowing egress.

As used herein, the term "native" refers to any software program that is installed on a mobile electronic device.

Certain benefits and advantages of the present disclosure include providing an enhanced and automated data security system to protect against data breaches from physical intruders at an edge data center or other manned or unmanned data facility.

In accordance with an exemplary use case provided by embodiments of the present disclosure, a facilities access breach detection and information protection system may comprise and be operably configured as follows:
1. Alarm sensor(s) detect(s) a person has breached the facility via one or more sensor, such as motion, sound, door open, window-open sensors;
2. The alarm sensor(s) send(s) notification(s) to a door access controller to determine if a user has a valid credential to access the site;
3. If the user does not possess valid credentials to access the site and a new alarm has been generated in a site that optionally has engaged alarms (active alarm sensing that is not suppressed), then a security breach has occurred in the facility and the door access controller communicates a notification to the erasing application on the server(s);
4. When the erasing application on the server receives the security breach notification from the door access controller, it executes an application and/or firmware software that permanently erases all data and software on the hard drive and optionally memory (this can include support for erasure commands, cryptographic erasure, self-encrypting drives, hidden areas, remapped sectors, freeze locked drives interactivity and various erasure standards);

5. Optionally, erasing operation status (e.g., erasing operations are about to start, have started or have successfully completed) is then communicated to a remote management system from the access control system, server or other system; and 6. Optionally, redundant verification can occur in order to detect an erasure success or failure by the door access controller and/or remote management system interactions with the server. If there is no response, then that can be an erasing validating response.

Turning now descriptively to the drawings, in which similar reference characters denote similar elements throughout the several views, FIG. 1 depicts an architecture diagram of a data protection system 100. In accordance with certain aspects of the present disclosure, system 100 may be installed at a secured data facility 11. Secured data facility 11 may comprise a centralized data center or edge data center facility. Secured data facility 11 may comprise a physical building having one or more access points, such as an access door 13 and a window 15. Secured data facility 11 may house one or more data servers 110 comprising one or more data stores 112. Data servers 110 and data stores 112 may be communicably engaged with one or more remote computing facilities via a communications network 118 to enable one or more distributing computing operations. Data servers 110 and data stores 112 may have a plurality of sensitive data stored thereon associated with the one or more distributing computing operations. In accordance with certain aspects of the present disclosure, system 100 is configured to protect the plurality of sensitive data stored on data servers 110 and data stores 112 from unauthorized access/hacking incident to a physical security breach of data facility 11.

In accordance with certain aspects of the present disclosure, system 100 may comprise one or more of system components 102-134. In accordance with certain aspects of the present disclosure, system 100 may be configured to detect an instance of unauthorized access to data facility 11 comprising a breach event at one or more access points, such as access door 13 and/or window 15. In accordance with certain aspects of the present disclosure, access door 13 may be equipped with a first breach detection sensor 128a and window 15 may be equipped with a second breach detection sensor 128b. Breach detection sensor 128a and breach detection sensor 128b may comprise one or more security sensors, including but not limited to glass break detection sensors, door/window contact sensors, motion detection sensors and the like. System 100 may comprise one or more additional security sensors configured to monitor one or more access point of data facility 11, including but not limited to video camera 132 and motion detection sensor 134. In accordance with certain aspects of the present disclosure, breach detection sensor 128a, breach detection sensor 128b, video camera 132 and motion detection sensor 134 may be communicably engaged with controller 102 to provide one or more inputs to controller 102. In accordance with certain embodiments, system 100 may comprise an electronic access control (EAC) device 126 operably engaged with door 13. EAC device 126 may comprise an electronic locking device configured to selectively grant/restrict access to door 13 to one or more authorized users. EAC device 126 may comprise one or more wireless communications interface to send and/or receive one or more wireless communications from one or more mobile electronic devices. EAC device 126 may be communicably engaged with controller 102 to process one or more user access requests and/or authenticate one or more authorized users. In accordance with certain aspects of the present disclosure, controller 102 may comprise at least one processor 104 and a non-transitory computer-readable memory device 106. In accordance with certain aspects of the present disclosure, system 100 may further comprise an alarm system 114 comprising one or more alarm 116. Alarm system 114 may be operably coupled to controller 102 to monitor and determine one or more breach event and activate alarm 116 in response thereto.

In accordance with certain aspects of the present disclosure, system 100 may further comprise at least one security server 108 communicably engaged with controller 102. In accordance with certain aspects of the present disclosure, controller 102 may be configured to process one or more inputs from breach detection sensors 128a-b, video camera 132, motion sensor 134 and alarm system 114 and communicate a breach event signal to security server 108. In accordance with certain aspects of the present disclosure, security server 108 may comprise an erasure application 110. Erasure application 110 may comprise one or more software operations for performing one or more data sanitization methods for data residing on data servers 110 and data stores 112. The one or more data sanitization methods may comprise one or more data erasure methods, data wipe methods, wipe algorithms, and data wipe standards. The one or more data sanitization methods encoded in erasure application 110 may include one or more methods including but not limited to SECURE ERASE, DoD 5220.22-M, NCSC-TG-025, AFSSI-5020, AR 380-19, NAVSO P-5239-26, RCMP TSSIT OPS-II, CSEC ITSG-06, HMG IS5, VSITR, GOST R 50739-95, Gutmann method, Schneier method, Pfitzner method, random data method, write zero method and the like. In accordance with certain aspects of the present disclosure, security server 108 may be communicably engaged with one or more remote management server 120 over network 118. Security server 108 may be configured to communicate a status of a breach event and/or a status of one or more erasure operations of erasure application 110 to management server 120 in real-time. Management server 120 may be communicably engaged with one or more client device 124 over network 118 to communicate the status of the breach event and/or the status of one or more erasure operations in real-time. In accordance with certain aspects of the present disclosure, management server 120 and/or one or more client device 124 may be communicably engaged with security server 108 to perform one or more redundant verification operations. In accordance with certain embodiments, the one or more redundant verification operations may include one or more redundancy check or cyclic redundancy check to ensure that data residing on data servers 110 and data stores 112 has been erased. In accordance with certain embodiments, a lack of a response from security server 108 may comprise an erasing validating response.

In accordance with certain aspects of the present disclosure, system 100 may be operably configured according to the following use case. In accordance with certain aspects of the present disclosure, data facility 11 may comprise a secured building comprising one or more access points, such as door 13 and window 15, housing data servers 110 and data stores 112. Breach detection sensor 128a, breach detection sensor 128b, video camera 132 and motion detection sensor 134 may detect an access attempt at door 13 and/or window 15 via one or more sensor measurement and communicate a signal comprising the sensor measurements to controller 102 and/or alarm system 114. Controller 102 configured to perform one or more operations to determine whether the sensor input is indicative of a breach event or an authorized access event. In accordance with certain embodiments, controller 102 is operably engaged with EAC device 126 to determine whether the sensor input is indicative of a breach event or an authorized access event. If controller 102 determines the sensor input is indicative of a breach event, controller 102 sends a command signal to security server 108. Upon receipt of the command signal from controller 102, security server 108 launches an instance of erasure application 110. Erasure application 110 executes one or more data sanitization/erasure operations to delete all or part of the data residing on data servers 110 and data stores 112. Security server 108 may communicate a status of the one or more data sanitization/erasure operations in real-time to management server 120 and management server 120 may perform one or more verification steps to verify that all or part of the data residing on data servers 110 and data stores 112 has been erased.

Figure 2:
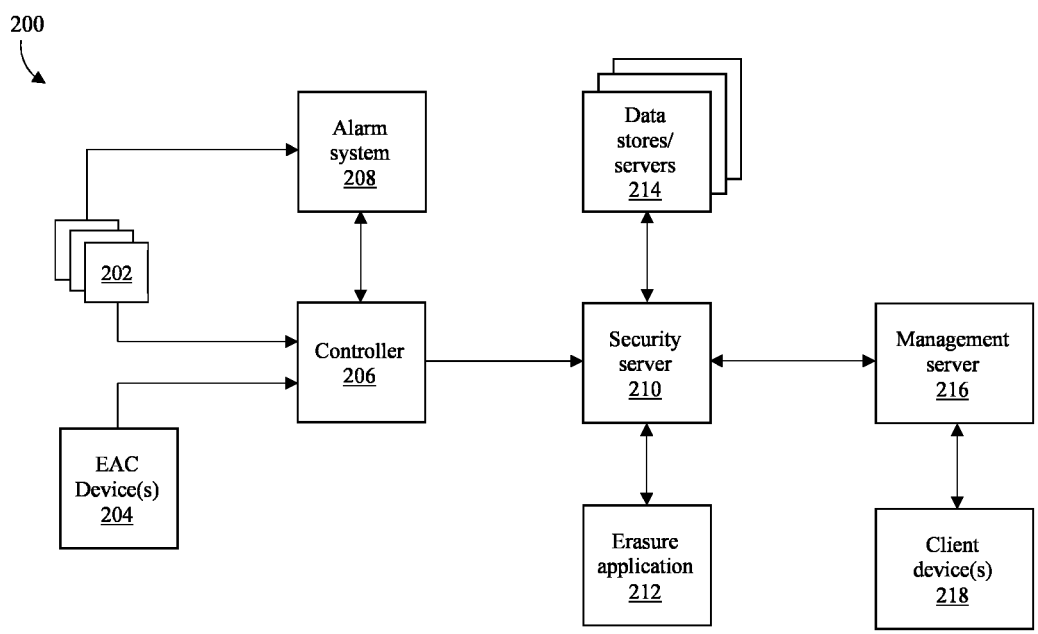
FIG. 2 is a functional block diagram of a data protection system, in accordance with certain aspects of the present disclosure.

Referring now to FIG. 2, a functional block diagram of a data protection system 200 is shown. In accordance with certain aspects of the present disclosure, data protection system 200 may be embodied as data protection system 100, as shown and described in FIG. 1. In accordance with certain aspects of the present disclosure, one or more breach detection sensors 202 may be communicably engaged with a controller 206 to provide one or more sensor inputs to controller 206 and/or an alarm system 208. One or more EAC devices 204 may be configured to selectively secure an access point of a secured data facility and may be communicably engaged with controller 206 to verify one or more user/access credentials from one or more users. Controller 206 may process one or more inputs from breach detection sensors 202, EAC devices 204 and/or alarm system 208 to determine whether a breach event has occurred at the secured data facility. If controller 206 determines a breach event to have occurred, controller 206 may send a command signal to a security server 210, and security server 210 may initiate an instance of an erasure application 212 residing thereon. Erasure application 212 may perform one or more data sanitization operations to permanently delete all or a portion of a plurality of data residing on data stores/servers 214. Security server 210 may be communicably engaged with a management server 216 to communicate the existence of the breach event and/or a status of the one or more data sanitization operations in real-time. Management server 216 may be communicably engaged with one or more client devices 218 to communicate the existence of the breach event and/or a status of the one or more data sanitization operations to one or more users in real-time.

Figure 3:
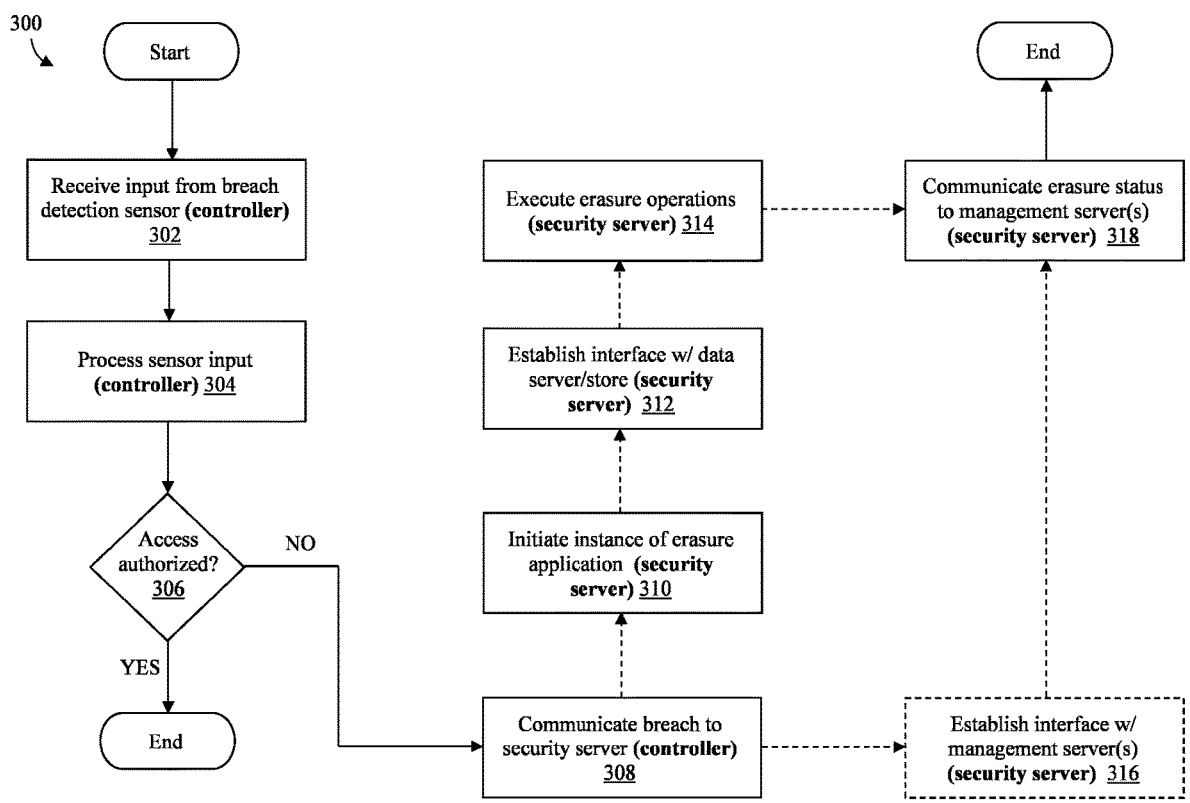
FIG. 3 is a functional block diagram of a data protection system, in accordance with certain aspects of the present disclosure.

Referring now to FIG. 3, a process flow diagram of a routine 300 of a data protection system is shown. In accordance with certain aspects of the present disclosure, routine 300 may be embodied as a routine of system 100 and/or system 200, as shown in FIGS. 1 and 2. In accordance with certain aspects of the present disclosure, routine 300 may be initiated by executing one or more steps or operations for receiving a sensor input from one or more breach detection sensors at a controller (e.g., an EAC controller) (Step 302). In accordance with certain embodiments, the sensor input may be associated with an access attempt at one or more access points of a secured data facility that houses one or more data servers therein. Routine 300 may proceed by executing one or more steps or operations for processing the sensor input at the controller according to one or more processing framework (Step 304). The one or more processing framework may be configured to process the sensor input to determine whether the access attempt at the one or more access points of the secured data facility comprises an authorized access at the data facility (Step 306). If YES (i.e., the access is authorized), then routine 300 is terminated. If NO (i.e., the access is not authorized), then routine 300 may proceed by executing one or more steps or operations for communicating a breach event notification from the controller to a security server (Step 308). In accordance with certain embodiments, routine 300 may be configured to establish a communications interface with one or more remote management server (Step 316). In accordance with certain embodiments, routine 300 may proceed by executing one or more steps or operations for initiating an instance of an erasure application residing on the security server (Step 310). In accordance with certain embodiments, the erasure application may be configured to perform one or more data sanitization operations configured to erase all or part of a plurality of data residing on one or more data servers/stores housed at the secured data facility. In accordance with certain embodiments, the one or more data sanitization operations may comprise one or more data erasure methods, data wipe methods, wipe algorithms, and/or data wipe standards. In accordance with certain aspects of the present disclosure, routine 300 may proceed by executing one or more operations for establishing an interface (e.g., application programming interface) with the one or more data servers/stores housed at the secured data facility (Step 312). Upon establishing an interface with the one or more data servers/stores, routine 300 may execute one or more steps or operations for executing the data erasure operations via the erasure application executing on the security server (Step 314). Routine 300 may proceed by communicating a status of the erasure operations of the erasure application from the security server to the remote management server (Step 318).

Figure 4:
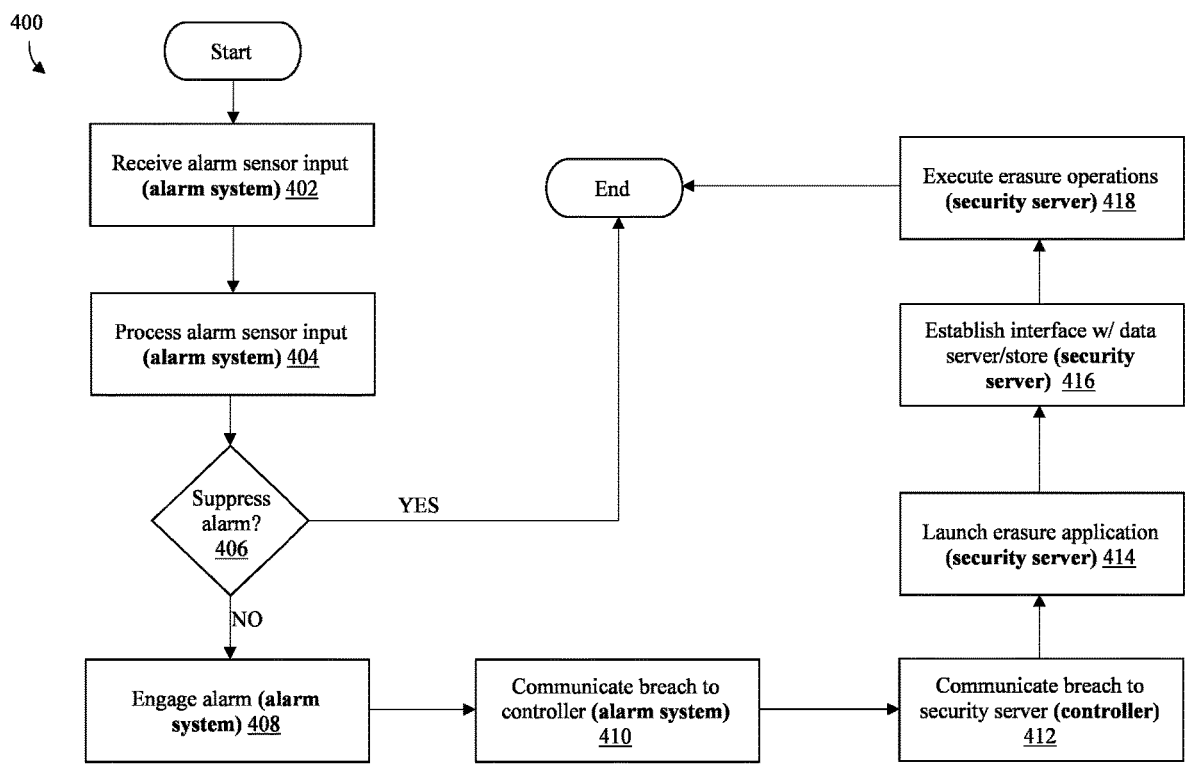
FIG. 4 is a process flow diagram of a routine of a data protection system, in accordance with certain aspects of the present disclosure.

Referring now to FIG. 4, a process flow diagram of a routine 400 of a data protection system is shown. In accordance with certain aspects of the present disclosure, routine 400 may be embodied as an operational routine of system 100 and/or system 200, as shown in FIGS. 1 and 2. In accordance with certain embodiments, routine 400 may be sequential to routine 300 and/or may comprise one or more subroutines or suboperations of routine 300, as shown in FIG. 3. In accordance with certain aspects of the present disclosure, routine 400 may be initiated by performing one or more steps or operations for receiving an alarm sensor input from an alarm system (Step 402). In accordance with certain embodiments, the alarm system may be operably installed to secure/monitor one or more access points of a secured data facility housing one or more data servers. Routine 400 may proceed by executing one or more steps or operations for processing the alarm sensor input at a controller of the alarm system (Step 404). The controller of the alarm sensor may perform one or more data processing steps to determine whether to suppress an alarm of the alarm system or engage an alarm of the alarm system. If YES (e.g., the alarm is suppressed), then routine 400 is terminated. If NO (i.e., the alarm is not suppressed), then routine 400 may proceed by executing one or more steps or operations for engaging an alarm of the alarm system (Step 408) and communicating the breach event to a controller (e.g., an EAC controller) (Step 410). Routine 400 may proceed by executing one or more steps or operations for communicating a breach event notification from the controller to a security server (Step 412). In accordance with certain embodiments, routine 400 may proceed by executing one or more steps or operations for initiating an instance of an erasure application residing on the security server (Step 414). In accordance with certain embodiments, the erasure application may be configured to perform one or more data sanitization operations configured to erase all or part of a plurality of data residing on one or more data servers/stores housed at the secured data facility. In accordance with certain embodiments, the one or more data sanitization operations may comprise one or more data erasure methods, data wipe methods, wipe algorithms, and/or data wipe standards. In accordance with certain aspects of the present disclosure, routine 400 may proceed by executing one or more operations for establishing an interface (e.g., application programming interface) with the one or more data servers/stores housed at the secured data facility (Step 416). Upon establishing an interface with the one or more data servers/stores, routine 400 may execute one or more steps or operations for executing the data erasure operations via the erasure application executing on the security server (Step 418).

Figure 5:
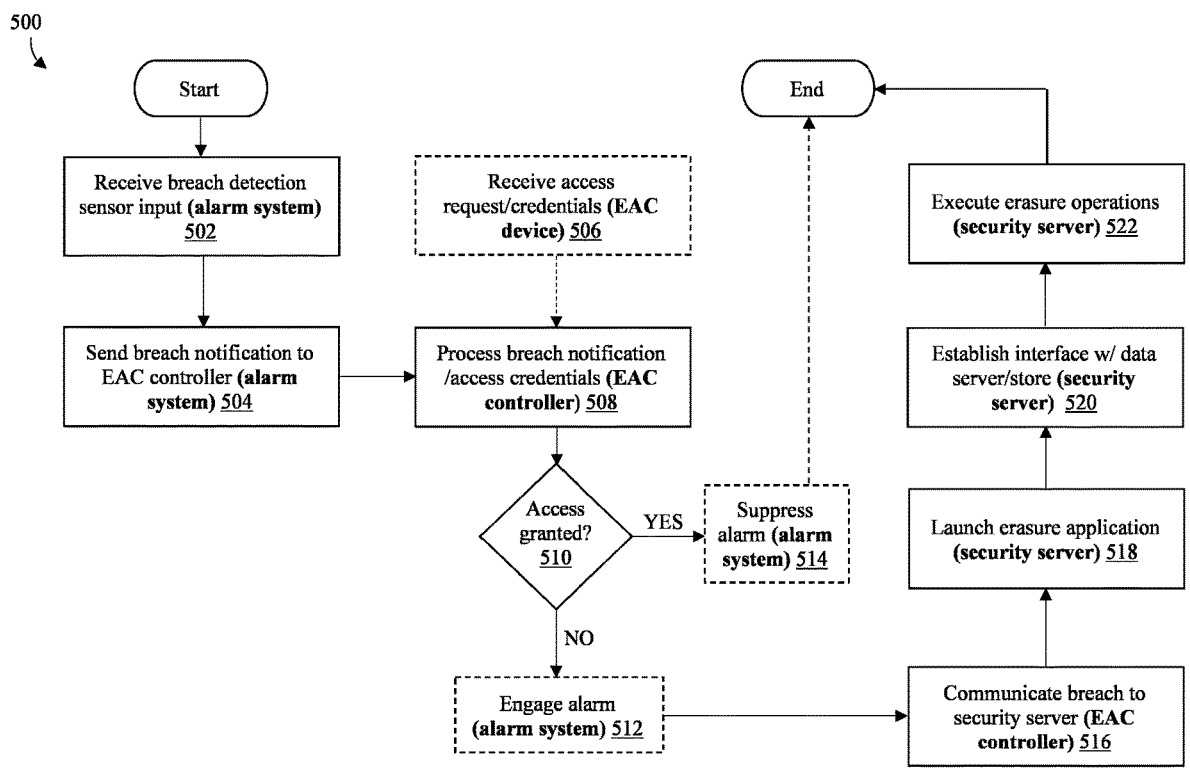
FIG. 5 is a process flow diagram of a routine of a data protection system, in accordance with certain aspects of the present disclosure.

Referring now to FIG. 5, a process flow diagram of a routine 500 of a data protection system is shown. In accordance with certain aspects of the present disclosure, routine 500 may be embodied as an operational routine of system 100 and/or system 200, as shown in FIGS. 1 and 2. In accordance with certain embodiments, routine 500 may be sequential to routine 300 (as shown in FIG. 3) or routine 400 (as shown in FIG. 4) and/or may comprise one or more subroutines or suboperations of routine 300 or routine 400. In accordance with certain aspects of the present disclosure, routine 500 may be initiated upon receiving a breach detection sensor input via one or more breach detection sensors at a controller of an alarm system operably installed at a secured data facility housing one or more data servers (Step 502). Routine 500 may proceed by executing one or more steps or operations for communicating a breach notification from the alarm system to an EAC controller (Step 504). Routine 500 may comprise one or more steps or operations for receiving an access request and user credentials from one or more user at an EAC device installed at an access point of the secured data facility (Step 506). Routine 500 may proceed by executing one or more steps or operations for processing the breach notification and the access credentials at the EAC controller (Step 508). Routine 500 may perform one or more data processing operations to process the access request/user credentials to determine whether access has been granted to the secured data facility (Step 510). If YES (i.e., the access request/user credentials are valid and access has been granted), then routine 500 may continue by executing one or more steps or operations for suppressing an alarm of the alarm system (Step 514) before termination of routine 500. If NO, (i.e., the access request/user credentials are not valid and access has not been granted), then routine 500 may continue by executing one or more steps or operations for engaging an alarm of the alarm system (Step 512) and communicating a breach event notification from the controller to a security server (Step 516). In accordance with certain embodiments, routine 500 may proceed by executing one or more steps or operations for initiating an instance of an erasure application residing on the security server (Step 518). In accordance with certain embodiments, the erasure application may be configured to perform one or more data sanitization operations configured to erase all or part of a plurality of data residing on one or more data servers/stores housed at the secured data facility. In accordance with certain embodiments, the one or more data sanitization operations may comprise one or more data erasure methods, data wipe methods, wipe algorithms, and/or data wipe standards. In accordance with certain aspects of the present disclosure, routine 500 may proceed by executing one or more operations for establishing an interface (e.g., application programming interface) with the one or more data servers/stores housed at the secured data facility (Step 520). Upon establishing an interface with the one or more data servers/stores, routine 500 may execute one or more steps or operations for executing the data erasure operations via the erasure application executing on the security server (Step 522).

Figure 6:
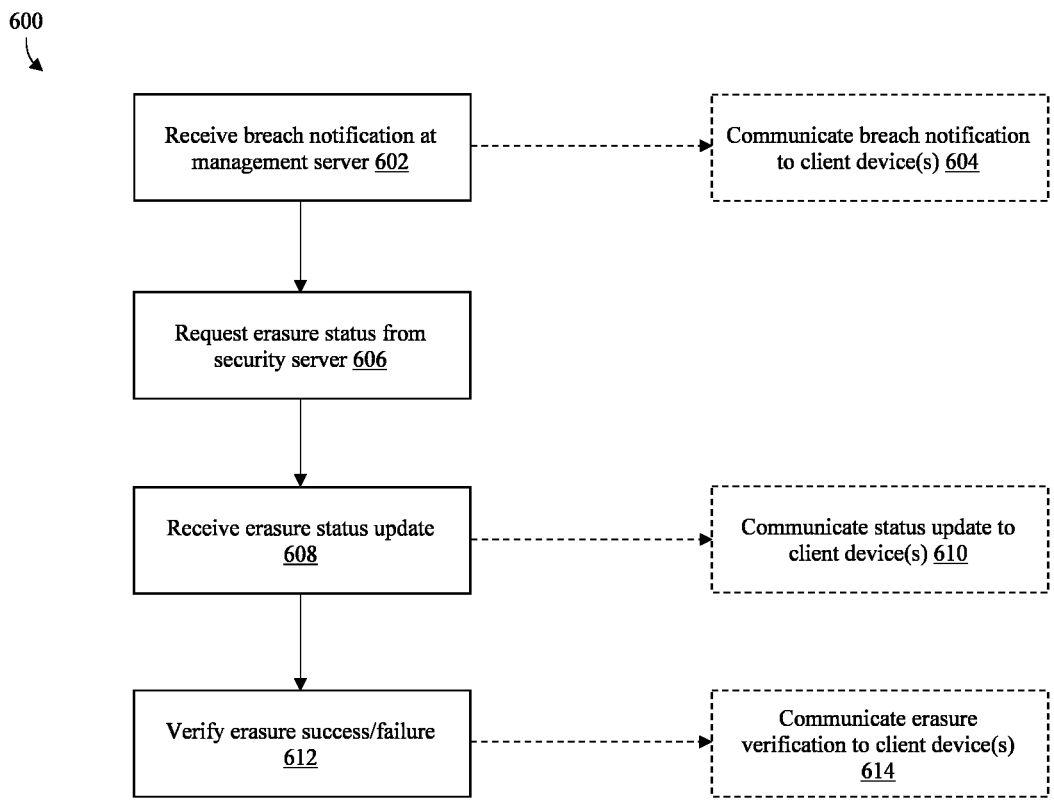
FIG. 6 is a process flow diagram of a routine of a data protection system, in accordance with certain aspects of the present disclosure.

Referring now to FIG. 6, a process flow diagram of a routine 600 of a data protection system is shown. In accordance with certain aspects of the present disclosure, routine 600 may be embodied as an operational routine of system 100 and/or system 200, as shown in FIGS. 1 and 2. In accordance with certain embodiments, routine 600 may be sequential to routine 300 (as shown in FIG. 3) and/or routine 400 (as shown in FIG. 4) and/or routine 500 (as shown in FIG. 5) and/or may comprise one or more subroutines or suboperations of routine 300 and/or routine 400 and/or routine 500. In accordance with certain aspects of the present disclosure, routine 600 may be initiated upon receiving a breach notification from a security server at a remote management server (Step 602). In certain embodiments, routine 600 may comprise one or more operations for communicating the breach notification to one or more client devices communicably engaged with the remote management server (Step 604). Routine 600 may proceed by executing one or more steps or operations for requesting an erasure status from the security server (Step 606). Routine 600 may proceed by executing one or more steps or operations for receiving an erasure status update from the security server (Step 608) and, optionally, executing one or more steps or operations for communicating the status update to the one or more client devices communicably engaged with the remote management server (Step 610). Routine 600 may proceed by executing one or more steps or operations for performing one or more redundant verification operations to verify erasure success/failure with the security server (Step 612) and, optionally, communicating the erasure verification (e.g., success/failure) to the one or more client devices communicably engaged with the remote management server (Step 614).

Figure 7:
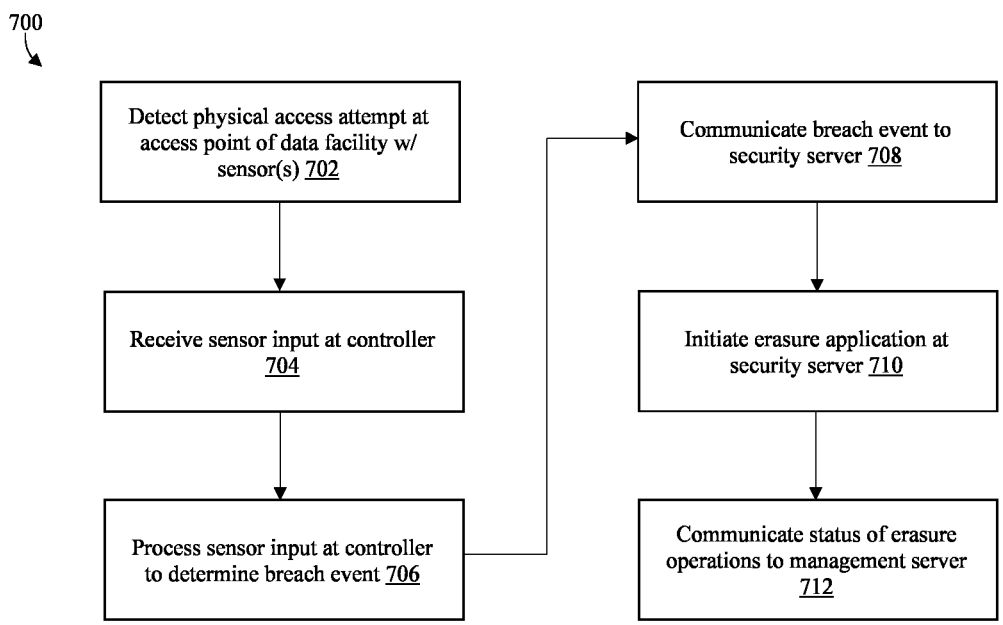
FIG. 7 is a process flow diagram of a data protection method, in accordance with certain aspects of the present disclosure.

Referring now to FIG. 7, a process flow diagram of a data protection method 700 is shown. In accordance with certain aspects of the present disclosure, method 700 may be embodied as one or more operations or processes of system 100 and/or system 200, as shown in FIGS. 1 and 2 and/or may be embodied as one or more steps or operations of routines 300-600, as shown in FIGS. 3-6. In accordance with certain aspects of the present disclosure, method 700 may be initiated by performing one or more steps or operations for detecting, with at least one breach detection sensor, a physical access attempt at an access point of a data center facility (Step 702). Method 700 may proceed by performing one or more steps or operations for receiving, with a controller communicably engaged with the at least one breach detection sensor, at least one sensor input from the at least one breach detection sensor in response to the physical access attempt at the access point of the data center facility (Step 704). Method 700 may proceed by performing one or more steps or operations for processing the at least one sensor input at the controller to determine whether a breach event has occurred in response to the at least one sensor input from the at least one breach detection sensor (Step 706). In accordance with certain aspects of the present disclosure, in response to determining the breach event has occurred, method 700 may proceed by performing one or more steps or operations for communicating, with the controller, a command signal comprising a confirmation of the breach event to a security server (Step 708). In accordance with certain aspects of the present disclosure, the security server comprises an erasure software stored thereon that, when executed, is configured to permanently erase all or a portion of data residing on one or more hard drives or memory devices (e.g., servers) communicably engaged with the security server and housed at the data center facility. Method 700 may proceed by performing one or more steps or operations for initiating an instance of the erasure software at the security server (Step 710). In accordance with certain embodiments, the erasure software may be configured to perform one or more data sanitization operations configured to erase all or part of a plurality of data residing on the hard drives or memory devices (e.g., servers) communicably engaged with the security server. In accordance with certain embodiments, the one or more data sanitization operations may comprise one or more data erasure methods, data wipe methods, wipe algorithms, and/or data wipe standards. Method 700 may proceed/conclude by performing one or more steps or operations for communicating a status of the erasure operations for the erasure software to a remote management server (Step 712).

Figure 8:
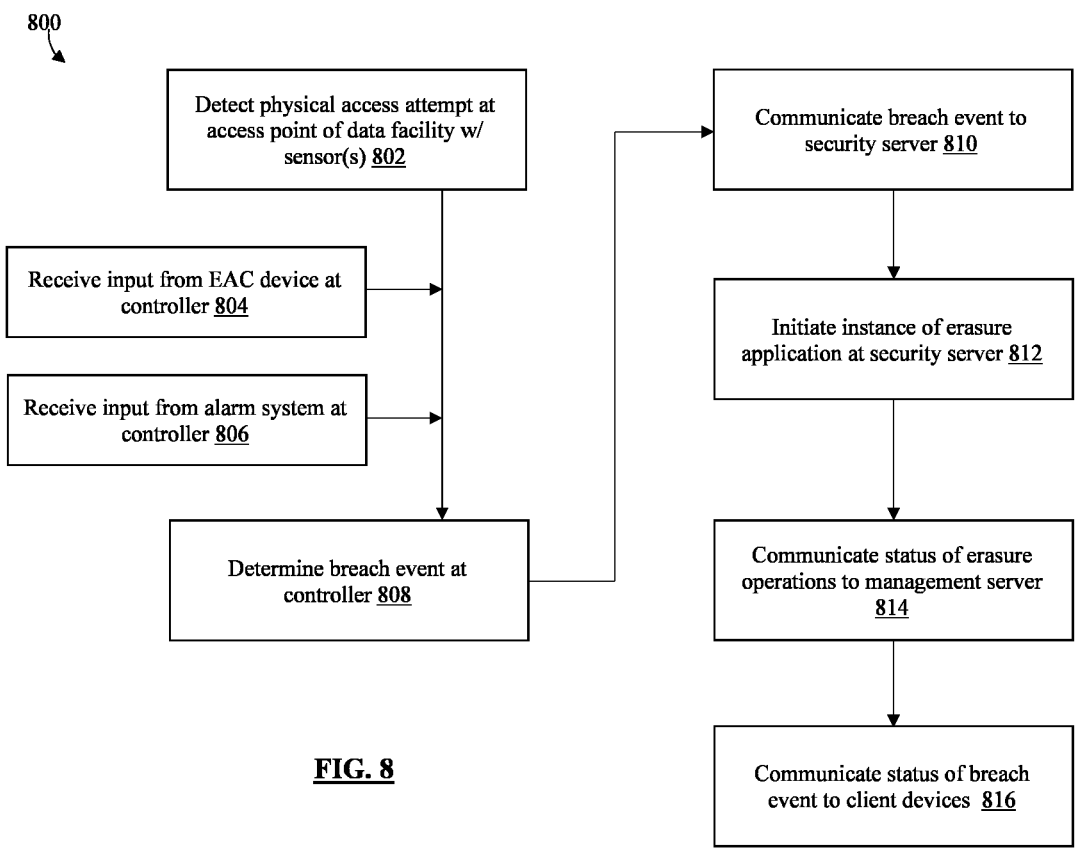
FIG. 8 is a process flow diagram of a data protection method, in accordance with certain aspects of the present disclosure.

Referring now to FIG. 8, a process flow diagram of a data protection method 800 is shown. In accordance with certain aspects of the present disclosure, method 800 may be embodied as one or more operations or functions of system 100 and/or system 200, as shown in FIGS. 1 and 2 and/or may be embodied as one or more steps or operations of routines 300-600, as shown in FIGS. 3-6. In accordance with certain embodiments, method 800 may be sequential to routine 700 and/or may comprise one or more sub-steps of method 700, as shown in FIG. 7. In accordance with certain aspects of the present disclosure, method 800 may comprise performing one or more steps or operations for detecting, with one or more breach detection sensors, a physical access attempt at an access point of secured data facility (Step 802). Optionally, method 800 may proceed by performing one or more steps or operations for receiving an input comprising an access request from an EAC device at controller of a data protection system (Step 804). Optionally, method 800 may proceed by performing one or more steps or operations for receiving a breach detection input from an alarm system at the controller of the data protection system (Step 806). Method 800 may comprise one or more steps or operations for processing the system inputs to the controller of the data protection system to determine whether a breach event has occurred (Step 808). If a breach event has occurred, method 800 may proceed by performing one or more steps or operations for communicating the breach event to a security server of the data protection system (Step 810). Method 800 may proceed by performing one or more steps or operations for initiating an instance of an erasure application at the security server (Step 812). In accordance with certain embodiments, the erasure application may be configured to perform one or more data sanitization operations configured to erase all or part of a plurality of data residing on one or more hard drives or memory devices (e.g., servers) communicably engaged with the security server. In accordance with certain embodiments, the one or more data sanitization operations may comprise one or more data erasure methods, data wipe methods, wipe algorithms, and/or data wipe standards. In accordance with certain embodiments, method 800 may proceed by performing one or more steps or operations for communicating a status of erasure operations to a management server, optionally in real-time (Step 814). Method 700 may proceed/conclude by performing one or more steps or operations for communicating a status of the breach event, including a status of the erasure application, to one or more client devices communicably engaged with the management server, optionally in real-time (Step 816).

Figure 9:
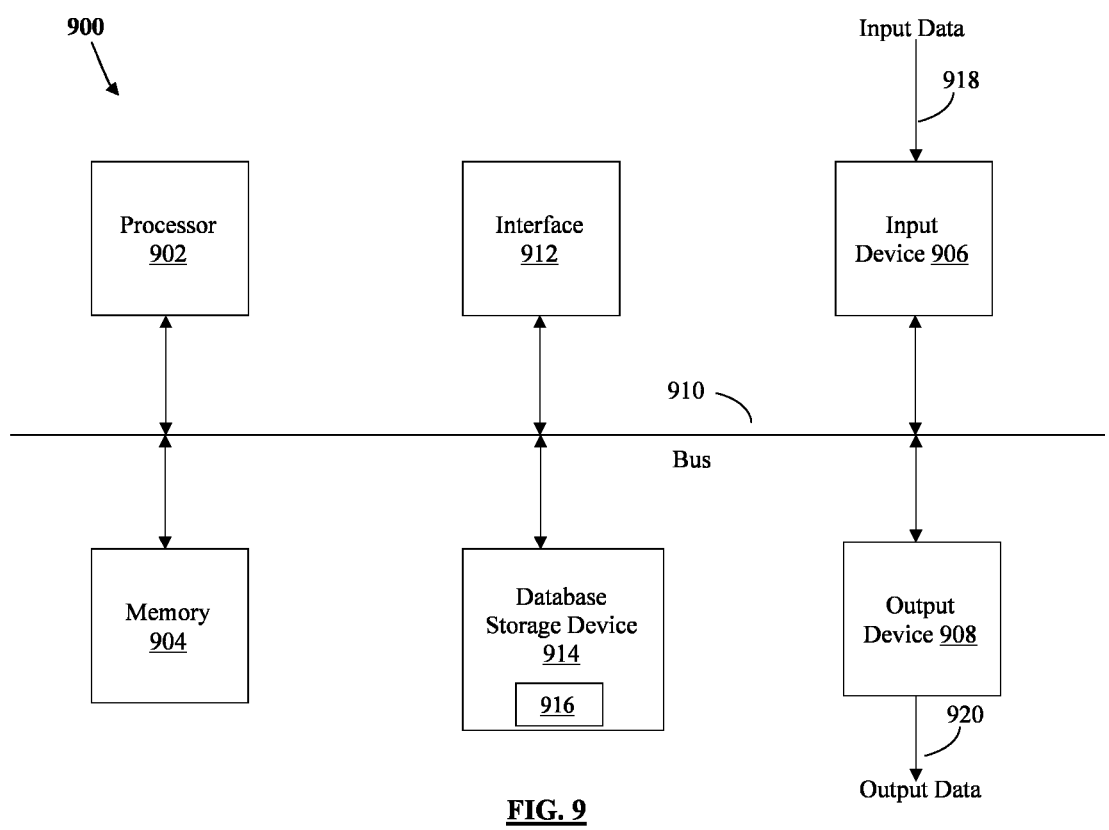
FIG. 9 is an illustrative embodiment of a computing device through which one or more aspects of the present disclosure may be implemented.

Referring now to FIG. 9, a processor-implemented computing device in which one or more aspects of the present disclosure may be implemented is shown. According to an embodiment, a processing system 900 may generally comprise at least one processor 902, or processing unit or plurality of processors, memory 904, at least one input device 906 and at least one output device 908, coupled together via a bus or group of buses 910. In certain embodiments, input device 906 and output device 908 could be the same device. An interface 912 can also be provided for coupling the processing system 900 to one or more peripheral devices, for example interface 912 could be a PCI card or PC card. At least one storage device 914 which houses at least one database 916 can also be provided. The memory 904 can be any form of memory device, for example, volatile or non-volatile memory, solid state storage devices, magnetic devices, etc. The processor 902 could comprise more than one distinct processing device, for example to handle different functions within the processing system 900. Input device 906 receives input data 918 and can comprise, for example, a keyboard, a pointer device such as a pen-like device or a mouse, audio receiving device for voice-controlled activation such as a microphone, data receiver or antenna such as a modem or wireless data adaptor, data acquisition card, etc. Input data 918 could come from different sources, for example keyboard instructions in conjunction with data received via a network. Output device 908 produces or generates output data 920 and can comprise, for example, a display device or monitor in which case output data 920 is visual, a printer in which case output data 920 is printed, a port for example a USB port, a peripheral component adaptor, a data transmitter or antenna such as a modem or wireless network adaptor, etc. Output data 920 could be distinct and derived from different output devices, for example a visual display on a monitor in conjunction with data transmitted to a network. A user could view the data output, or an interpretation of the data output, on, for example, a monitor or using a printer. The storage device 914 can be any form of data or information storage means, for example, volatile or non-volatile memory, solid state storage devices, magnetic devices, etc.

In use, the processing system 900 is adapted to allow data or information to be stored in and/or retrieved from, via wired or wireless communication means, at least one database 916. The interface 912 may allow wired and/or wireless communication between the processing unit 902 and peripheral components that may serve a specialized purpose. In general, the processor 902 can receive instructions as input data 918 via input device 906 and can display processed results or other output to a user by utilizing output device 908. More than one input device 906 and/or output device 908 can be provided. It should be appreciated that the processing system 900 may be any form of terminal, server, specialized hardware, or the like.

It is to be appreciated that the processing system 900 may be a part of a networked communications system. Processing system 900 could connect to a network, for example the Internet or a WAN. Input data 918 and output data 920 could be communicated to other devices via the network. The transfer of information and/or data over the network can be achieved using wired communications means or wireless communications means. A server can facilitate the transfer of data between the network and one or more databases. A server and one or more databases provide an example of an information source.

Thus, the processing computing system environment 900 illustrated in FIG. 9 may operate in a networked environment using logical connections to one or more remote computers. The remote computer may be a personal computer, a server, a router, a network PC, a peer device, or other common network node, and typically includes many or all of the elements described above.

It is to be further appreciated that the logical connections depicted in FIG. 9 include a local area network (LAN) and a wide area network (WAN) but may also include other networks such as a personal area network (PAN). Such networking environments are commonplace in offices, enterprise-wide computer networks, intranets, and the Internet. For instance, when used in a LAN networking environment, the computing system environment 900 is connected to the LAN through a network interface or adapter. When used in a WAN networking environment, the computing system environment typically includes a modem or other means for establishing communications over the WAN, such as the Internet. The modem, which may be internal or external, may be connected to a system bus via a user input interface, or via another appropriate mechanism. In a networked environment, program modules depicted relative to the computing system environment 900, or portions thereof, may be stored in a remote memory storage device. It is to be appreciated that the illustrated network connections of FIG. 9 are exemplary and other means of establishing a communications link between multiple computers may be used.

FIG. 9 is intended to provide a brief, general description of an illustrative and/or suitable exemplary environment in which embodiments of the below described present invention may be implemented. FIG. 9 is an example of a suitable environment and is not intended to suggest any limitation as to the structure, scope of use, or functionality of an embodiment of the present invention. A particular environment should not be interpreted as having any dependency or requirement relating to any one or combination of components illustrated in an exemplary operating environment. For example, in certain instances, one or more elements of an environment may be deemed not necessary and omitted. In other instances, one or more other elements may be deemed necessary and added.

In the description above, certain embodiments may have been described with reference to acts and symbolic representations of operations that are performed by one or more computing devices, such as the computing system environment 900 of FIG. 9. As such, it will be understood that such acts and operations, which are at times referred to as being computer-executed, include the manipulation by the processor of the computer of electrical signals representing data in a structured form. This manipulation transforms the data or maintains them at locations in the memory system of the computer, which reconfigures or otherwise alters the operation of the computer in a manner understood by those skilled in the art. The data structures in which data is maintained are physical locations of the memory that have particular properties defined by the format of the data. However, while an embodiment is being described in the foregoing context, it is not meant to be limiting as those of skill in the art will appreciate that the acts and operations described hereinafter may also be implemented in hardware.

Embodiments may be implemented with numerous other general-purpose or special-purpose computing devices and computing system environments or configurations. Examples of well-known computing systems, environments, and configurations that may be suitable for use with an embodiment include, but are not limited to, personal computers, handheld or laptop devices, personal digital assistants, multiprocessor systems, microprocessor-based systems, set top boxes, programmable consumer electronics, network, minicomputers, server computers, game server computers, web server computers, mainframe computers, and distributed computing environments that include any of the above systems or devices.

Embodiments may be described in a general context of computer-executable instructions, such as program modules, being executed by a computer. Generally, program modules include routines, programs, objects, components, data structures, etc., that perform particular tasks or implement particular abstract data types. An embodiment may also be practiced in a distributed computing environment where tasks are performed by remote processing devices that are linked through a communications network. In a distributed computing environment, program modules may be located in both local and remote computer storage media including memory storage devices.

With the exemplary computing system environment 900 of FIG. 9 being generally shown and discussed above, description will now turn towards illustrated embodiments of the present invention which generally relates to methods for a facilities access breach detection and data protection system and method. It is to be understood and appreciated that the methods involve detecting, with at least one breach detection sensor, a physical access attempt at an access point of a data center facility; receiving, with a controller communicably engaged with the at least one breach detection sensor, at least one sensor input from the at least one breach detection sensor in response to the physical access attempt at the access point of the data center facility; determining, with the controller, whether a breach event has occurred in response to the at least one sensor input from the at least one breach detection sensor; in response to determining the breach event has occurred, communicating, with the controller, a command signal to one or more local server, wherein the one or more local server comprises an erasure software stored thereon that, when executed, is configured to permanently erase all or a portion of data residing on one or more hard drives or memory devices communicably engaged with the one or more local server; and executing the one or more operations of the erasure software in response to communicating the command signal to one or more local server.

As will be appreciated by one of skill in the art, the present invention may be embodied as a method (including, for example, a computer-implemented process, a business process, and/or any other process), apparatus (including, for example, a system, machine, device, computer program product, and/or the like), or a combination of the foregoing. Accordingly, embodiments of the present invention may take the form of an entirely hardware embodiment, an entirely software embodiment (including firmware, resident software, micro-code, etc.), or an embodiment combining software and hardware aspects that may generally be referred to herein as a "system." Furthermore, embodiments of the present invention may take the form of a computer program product on a computer-readable medium having computer-executable program code embodied in the medium.

Any suitable transitory or non-transitory computer readable medium may be utilized. The computer readable medium may be, for example but not limited to, an electronic, magnetic, optical, electromagnetic, infrared, or semiconductor system, apparatus, or device. More specific examples of the computer readable medium include, but are not limited to, the following: an electrical connection having one or more wires; a tangible storage medium such as a portable computer diskette, a hard disk, a random-access memory (RAM), a read-only memory (ROM), an erasable programmable read-only memory (EPROM or Flash memory), a compact disc read-only memory (CD-ROM), or other optical or magnetic storage device.

In the context of this document, a computer readable medium may be any medium that can contain, store, communicate, or transport the program for use by or in connection with the instruction execution system, apparatus, or device. The computer usable program code may be transmitted using any appropriate medium, including but not limited to the Internet, wireline, optical fiber cable, radio frequency (RF) signals, or other mediums.

Computer-executable program code for carrying out operations of embodiments of the present invention may be written in an object oriented, scripted or unscripted programming language such as Java, Perl, Smalltalk, C++, or the like. However, the computer program code for carrying out operations of embodiments of the present invention may also be written in conventional procedural programming languages, such as the "C" programming language or similar programming languages.

Embodiments of the present invention are described above with reference to flowchart illustrations and/or block diagrams of methods, apparatus (systems), and computer program products. It will be understood that each block of the flowchart illustrations and/or block diagrams, and/or combinations of blocks in the flowchart illustrations and/or block diagrams, can be implemented by computer-executable program code portions. These computer-executable program code portions may be provided to a processor of a general-purpose computer, special purpose computer, or other programmable data processing apparatus to produce a particular machine, such that the code portions, which execute via the processor of the computer or other programmable data processing apparatus, create mechanisms for implementing the functions/acts specified in the flowchart and/or block diagram block or blocks.

These computer-executable program code portions may also be stored in a computer-readable memory that can direct a computer or other programmable data processing apparatus to function in a particular manner, such that the code portions stored in the computer readable memory produce an article of manufacture including instruction mechanisms which implement the function/act specified in the flowchart and/or block diagram block(s).

The computer-executable program code may also be loaded onto a computer or other programmable data processing apparatus to cause a series of operational phases to be performed on the computer or other programmable apparatus to produce a computer-implemented process such that the code portions which execute on the computer or other programmable apparatus provide phases for implementing the functions/acts specified in the flowchart and/or block diagram block(s). Alternatively, computer program implemented phases or acts may be combined with operator or human implemented phases or acts in order to carry out an embodiment of the invention.

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

Embodiments of the present invention are described above with reference to flowcharts and/or block diagrams. It will be understood that phases of the processes described herein may be performed in orders different than those illustrated in the flowcharts. In other words, the processes represented by the blocks of a flowchart may, in some embodiments, be in performed in an order other than the order illustrated, may be combined or divided, or may be performed simultaneously. It will also be understood that the blocks of the block diagrams illustrate, in some embodiments, merely conceptual delineations between systems, and one or more of the systems illustrated by a block in the block diagrams may be combined or shared hardware and/or software with another one or more of the systems illustrated by a block in the block diagrams. Likewise, a device, system, apparatus, and/or the like may be made up of one or more devices, systems, apparatuses, and/or the like. For example, where a processor is illustrated or described herein, the processor may be made up of a plurality of microprocessors or other processing devices which may or may not be coupled to one another. Likewise, where a memory is illustrated or described herein, the memory may be made up of a plurality of memory devices which may or may not be coupled to one another.

The terminology used herein is for describing particular embodiments only and is not intended to be limiting of the embodiments. As used herein, the singular forms "a," "an," and "the" are intended to include the plural forms as well, unless the context clearly indicates otherwise. It will be further understood that the terms "comprises," "comprising," "includes," and/or "including,", and variants thereof, when used herein, specify the presence of stated features, steps, operations, elements, and/or components, but do not preclude the presence or addition of one or more other features, steps, operations, elements, components, and/or groups thereof. As used herein, "exemplary" means serving as an example or illustration and does not necessarily denote ideal or best.

It will be understood that when an element is referred to as being "coupled," "connected," or "responsive" to another element, it can be directly coupled, connected, or responsive to the other element, or intervening elements may also be present. In contrast, when an element is referred to as being "directly coupled," "directly connected," or "directly responsive" to another element, there are no intervening elements present. As used herein, the term "and/or" includes any and all combinations of one or more of the associated listed items.

Spatially relative terms, such as "above," "below," "upper," "lower," "top, "bottom," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" other elements or features would then be oriented "above" the other elements or features. Thus, the term "below" can encompass both an orientation of above and below. The device may be otherwise oriented (rotated 90 degrees or at other orientations) and the spatially relative descriptors used herein interpreted accordingly. Well-known functions or constructions may not be described in detail for brevity and/or clarity.

It will be understood that, although the terms "first," "second," etc. may be used herein to describe various elements, these elements should not be limited by these terms. These terms are only used to distinguish one element from another. Thus, a first element could be termed a second element without departing from the teachings of the present embodiments. Unless otherwise defined, all terms (including technical and scientific terms) used herein have the same meaning as commonly understood by one of ordinary skill in the art to which these embodiments belong. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

Where a range of values is provided, it is understood that each intervening value, to the tenth of the unit of the lower limit unless the context clearly dictates otherwise, between the upper and lower limit of that range and any other stated or intervening value in that stated range is encompassed by the invention. The upper and lower limits of these smaller ranges may independently be included in the smaller ranges, and are also encompassed by the invention, subject to any specifically excluded limit in a stated range. Where a stated range includes one or both of the endpoint limits, ranges excluding either or both of those included endpoints are also included in the scope of the invention.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The present disclosure includes that contained in the appended claims as well as that of the foregoing description. Although this invention has been described in its exemplary forms with a certain degree of particularity, it is understood that the present disclosure of has been made only by way of example and numerous changes in the details of construction and combination and arrangement of parts may be employed without departing from the spirit and scope of the invention. Therefore, it will be apparent to those skilled in the art that various modifications and variations can be made to the disclosed embodiments without departing from the scope or spirit of the invention. In view of the foregoing, it is intended that the invention covers modifications and variations of this disclosure within the scope of the following claims and their equivalents.

What is claimed is:

1. A data protection system comprising:
    at least one breach detection sensor configured to detect a physical access attempt at an access point of a data center facility;
    an alarm system communicably engaged with the at least one breach detection sensor to receive at least one sensor input in response to the physical access attempt at the access point of the data center facility;
    a controller communicably engaged with the alarm system and one or more electronic access control device,
    wherein the controller is configured to command the one or more electronic access control device to selectively grant or restrict access to the access point of the data center facility,
    wherein the alarm system is configured to send a notification signal to the controller in response to the at least one sensor input,
    wherein the controller is configured to receive and process the notification signal and one or more access credentials for the one or more electronic access control device to determine whether the physical access attempt at the access point of the data center facility is authorized;
    one or more server communicably engaged with the controller or the alarm system, wherein the one or more server comprises an erasure software stored thereon that, when executed, is configured to permanently erase all or a portion of data residing on one or more hard drives or memory devices communicably engaged with the one or more server,
    wherein one or more operations of the erasure software are executed in response to determining that the physical access attempt at the access point of the data center facility is not authorized.

2. The data protection system of claim 1 wherein the controller is configured to communicate a security breach notification to the one or more server in response to determining that the physical access attempt at the access point of the data center facility is not authorized.

3. The data protection system of claim 1 wherein the controller is configured to communicate an alarm suppression signal to the alarm system in response to determining that the physical access attempt at the access point of the data center facility is authorized.

4. The data protection system of claim 3 wherein the alarm system is configured to suppress an alarm in response to the alarm suppression signal.

5. The data protection system of claim 1 wherein the alarm system is configured to activate an alarm in response to the controller determining that the physical access attempt at the access point of the data center facility is not authorized.

6. The data protection system of claim 1 further comprising at least one remote server communicably engaged with the one or more server to receive an operation status of the erasure software in real-time.

7. The data protection system of claim 6 wherein the at least one remote server is configured to communicate the operation status of the erasure software to one or more client devices in real-time.

8. The data protection system of claim 6 wherein the at least one remote server is configured to communicate a breach event status to one or more client devices in real-time.

9. The data protection system of claim 1 wherein the one or more operations of the erasure software comprise one or more cryptographic erasure operations.

10. A data protection method comprising:
receiving, with an electronic access control device communicably engaged with a controller, an access request for an access point of a data center facility,
wherein the access request comprises at least one access credential for the electronic access control device,
wherein the electronic access control device is configured to selectively grant and restrict access to the access point of the data center facility;
detecting, with at least one breach detection sensor, a physical access attempt at the access point of the data center facility;
receiving, with an alarm system communicably engaged with the at least one breach detection sensor, at least one sensor input from the at least one breach detection sensor in response to the physical access attempt at the access point of the data center facility;
communicating, with the alarm system, a notification signal to the controller in response to the at least one sensor input;
processing, with the controller, the at least one access credential for the electronic access control device and the notification signal from the alarm system to determine whether the physical access attempt at the access point of the data center facility is authorized or unauthorized; and
in response to determining the physical access attempt at the access point of the data center facility is unauthorized,
communicating, with the controller, a command signal to one or more server,
wherein the one or more server comprises an erasure software stored thereon that, when executed, is configured to permanently erase all or a portion of data residing on one or more hard drives or memory devices communicably engaged with the one or more server,
wherein the one or more server is configured to execute one or more operations of the erasure software in response to receiving the command signal from the controller.

11. The data protection method of claim 10 further comprising communicating, with the one or more server, an operation status of the erasure software in real-time to at least one remote server.

12. The data protection method of claim 11 further comprising communicating, with the at least one remote server, an operation status of the erasure software in real-time to one or more client devices.

13. The data protection method of claim 10 further comprising communicating, with the one or more server, an operation status to one or more client devices.

14. The data protection method of claim 10 further comprising processing, with the controller, the access request to grant or deny access to the access point of the data center facility via the electronic access control device.

15. The data protection method of claim 10 further comprising communicating, with the controller, a security breach notification to the one or more server in response to determining that the physical access attempt at the access point of the data center facility is unauthorized.

16. The data protection method of claim 10 further comprising communicating, with the controller, an alarm suppression signal to the alarm system of the data center facility in response to determining that the physical access attempt at the access point of the data center facility is authorized.

17. The data protection method of claim 16 further comprising suppressing, with the alarm system, an alarm in response to the alarm suppression signal.

18. The data protection method of claim 10 further comprising activating, with the alarm system, an alarm in response to determining the physical access attempt at the access point of the data center facility is unauthorized.

19. The data protection method of claim 10 wherein the one or more hard drives or memory devices are physically present at the data center facility.

20. A non-transitory computer-readable medium encoded with instructions for commanding one or more processors to execute operations of a data protection method, the operations comprising:
receiving an electronic access request via a controller of an electronic access control device,
wherein the electronic access request comprises at least one access credential for the electronic access control device,
wherein the electronic access control device is configured to selectively grant and restrict access to an access point of a data center facility;
receiving a notification signal from an alarm system in response to at least one sensor input received at the alarm system,
wherein the at least one sensor input is received via at least one breach detection sensor in response to a physical access attempt at the access point of the data center facility;
processing the at least one access credential for the electronic access control device and the notification signal to determine whether the physical access attempt at the access point of the data center facility is authorized or unauthorized; and
in response to determining the physical access attempt at the access point of the data center facility is unauthorized,
communicating a command signal to one or more server,
wherein the one or more server comprises an erasure software stored thereon that, when executed, is configured to permanently erase all or a portion of data residing on one or more hard drives or memory devices communicably engaged with the one or more server.

* * * * *